(12) United States Patent
Tuttle et al.

(10) Patent No.: US 11,594,943 B2
(45) Date of Patent: Feb. 28, 2023

(54) IN PLACE MACHINING OF COLLECTOR RING

(71) Applicant: ANDRITZ HYDRO CORP., Charlotte, NC (US)

(72) Inventors: Christopher George Tuttle, Fort Smith, AR (US); Hiram Lee Avant, Wilmington, NC (US); William Hopper, Lewiston, ID (US); Lorenzo Pelayo, Payette, ID (US); Joseph Matthew Travis, Huntersville, NC (US); Bernard Cantin, Charlotte, NC (US)

(73) Assignee: ANDRITZ HYDRO CORP., Charlotte, NC (US)

( * ) Notice: Subject to any disclaimer, the term of this patent is extended or adjusted under 35 U.S.C. 154(b) by 61 days.

(21) Appl. No.: 17/376,014

(22) Filed: Jul. 14, 2021

(65) Prior Publication Data

US 2023/0020562 A1     Jan. 19, 2023

(51) Int. Cl.
| | | |
|---|---|---|
| *H02K 15/00* | (2006.01) | |
| *H02K 7/18* | (2006.01) | |
| *H02K 13/00* | (2006.01) | |
| *F03B 13/08* | (2006.01) | |
| *F03B 3/18* | (2006.01) | |

(52) U.S. Cl.
CPC ......... *H02K 15/0006* (2013.01); *F03B 3/183* (2013.01); *F03B 13/083* (2013.01); *H02K 7/1823* (2013.01); *H02K 13/003* (2013.01); *F05B 2220/706* (2013.01);

(Continued)

(58) Field of Classification Search
CPC ............. H02K 15/0006; F05B 2230/80; F05B 2230/10; B23P 6/002; B23P 6/00; B23Q 9/0021; F05D 2230/80
See application file for complete search history.

(56) References Cited

U.S. PATENT DOCUMENTS

| | | | | |
|---|---|---|---|---|
| 3,965,623 A | * | 6/1976 | Grutza | .................... B24B 23/08 451/418 |
| 5,148,635 A | * | 9/1992 | Porter | ..................... B23P 6/002 451/296 |

FOREIGN PATENT DOCUMENTS

| | | |
|---|---|---|
| CA | 2191933 | 6/1997 |
| CA | 2980655 | 11/2016 |

(Continued)

*Primary Examiner* — Christopher J Besler
(74) *Attorney, Agent, or Firm* — Kilpatrick Townsend & Stockton LLP (57) ABSTRACT

A method for in-place machining of a collector ring attached to a turbine shaft of a hydroelectric generator includes: attaching a support member to stationary portions of the hydroelectric generator, the support member being configured to support a machine tool at an angle parallel to an inclination angle of an axis of rotation of the turbine shaft; attaching an adjustable positioning device to the support member; attaching the machine tool to the adjustable positioning device, the machine tool being configured to perform a machining operation on the collector ring; controlling a rotational speed of the turbine shaft to a specified rotational speed by controlling a flow of water through the turbine; adjusting the adjustable positioning device to adjust a position of the machine tool with respect to the collector ring; and performing the machining operation on the collector ring at the specified rotational speed of the turbine shaft.

10 Claims, 9 Drawing Sheets

(52) U.S. Cl.
CPC ....... *F05B 2230/10* (2013.01); *F05B 2230/80* (2013.01); *F05B 2240/60* (2013.01); *F05B 2270/101* (2013.01)

(56) References Cited

FOREIGN PATENT DOCUMENTS

EP         1641091      4/2010
WO    2016174218   11/2016

* cited by examiner

IN PLACE MACHINING OF COLLECTOR RING

BACKGROUND

Unless otherwise indicated herein, the materials described in this section are not prior art to the claims in this application and are not admitted to be prior art by inclusion in this section.

A hydraulic turbine converts the energy of flowing water into mechanical energy. A hydroelectric generator converts this mechanical energy into electricity. The hydroelectric generator includes a stationary element referred to as a stator having loops of wire (conductors), and a rotating element referred to as a rotor that has loops of wire wound around stacks of magnetic steel laminations. When a magnet is moved past a conductor, it causes electricity to flow. In the hydroelectric generator, electromagnets are made by circulating direct current through the loops of wire wound around stacks of magnetic steel laminations of the rotor. The rotor is attached to the turbine shaft, and rotates as water flows past blades of the turbine. When the rotor turns, it causes the electromagnets to move past the conductors mounted in the stator causing a voltage to develop at the generator output terminals.

In order to provide the direct current to the rotor to energize the electromagnets, collector rings are provided on the turbine shaft to enable a connection between the rotating rotor and a direct current source. Brushes that are in contact with the collector rings form the stationary portion of the rotating connection. Over time, the brushes and collector rings may wear due to friction and dirt, and may sustain pitting damage caused by electrical arcing between the brushes and the collector rings, thereby reducing the efficiency of the hydroelectric generator. While the brushes may be easily replaced, repair or replacement of the collector rings often involves disassembly of significant portions of the hydroelectric generator. In particular, the physical arrangement of an inclined hydroelectric generator provides limited space to accommodate machinery to repair the collector rings and requires disassembly for the repair. Thus, the conventional repair procedures for the collector rings of an inclined hydroelectric generator can result in extended down time for the hydroelectric generator.

SUMMARY

Systems and methods for reconditioning a collector ring while installed in a hydroelectric generator are provided.

According to various aspects there is provided a method for controlling rotational speed of a turbine shaft during in-place machining of a collector ring attached to the turbine shaft of a hydroelectric generator. In some aspects, the method may include: closing a headgate of a water intake of a turbine of the hydroelectric generator to stop a flow of water from a water source and cause the turbine to cease rotation; setting wicket gates of the turbine of the hydroelectric generator to an open position; admitting an amount of water from the water source to the water intake of the turbine to rotate the turbine at a rotational speed higher than a specified rotational speed for performing a machining operation on the collector ring by partially opening the headgate; and adjusting a position of the wicket gates to regulate the rotational speed of the turbine to the specified rotational speed for the machining operation on the collector ring.

According to various aspects there is provided a method for in-place machining of a collector ring attached to a turbine shaft of a hydroelectric generator. In some aspects, the method may include: attaching a support member to stationary portions of the hydroelectric generator, the support member being configured to support a machine tool at an angle parallel to an inclination angle of an axis of rotation of the turbine shaft; attaching an adjustable positioning device to the support member; attaching the machine tool to the adjustable positioning device, the machine tool being configured to perform a machining operation on the collector ring; controlling a rotational speed of the turbine shaft to a specified rotational speed by controlling a flow of water through a turbine of the hydroelectric generator; adjusting the adjustable positioning device to adjust a position of the machine tool with respect to the collector ring; and performing the machining operation on the collector ring at the specified rotational speed of the turbine shaft.

According to various aspects there is provided a system for in-place machining of a collector ring attached to a turbine shaft of a hydroelectric generator. In some aspects, system may include: a support member configured to support a machine tool at an angle parallel to an inclination angle of an axis of rotation of the turbine shaft of a turbine of the hydroelectric generator; an adjustable positioning device configured to attach to the support member, the adjustable positioning device further configured accommodate the machine tool and provide positional adjustments of the machine tool with respect to the collector ring, the machine tool being configured to perform a machining operation on the collector ring during rotation of the turbine shaft; and a governor of the hydroelectric generator, the governor being configured to regulate a rotational speed the turbine shaft to a specified rotational speed. The rotation of the turbine shaft may be provided by water from a water source flowing over runner blades of a turbine of the hydroelectric generator.

BRIEF DESCRIPTION OF THE DRAWINGS

Aspects and features of the various embodiments will be more apparent by describing examples with reference to the accompanying drawings, in which.

DETAILED DESCRIPTION

While certain embodiments are described, these embodiments are presented by way of example only, and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

Similar reference characters indicate corresponding parts throughout the several views unless otherwise stated. Although the drawings represent embodiments of various features and components according to the present disclosure, the drawings are not necessarily to scale and certain features may be exaggerated in order to better illustrate embodiments of the present disclosure, and such exemplifications are not to be construed as limiting the scope of the present disclosure.

Except as otherwise expressly stated herein, the following rules of interpretation apply to this specification: (a) all words used herein shall be construed to be of such gender or number (singular or plural) as to circumstances require; (b) the singular terms "a," "an," and "the," as used in the specification and the appended claims include plural references unless the context clearly dictates otherwise; (c) the antecedent term "about" applied to a recited range or value denotes an approximation within the deviation in the range or values known or expected in the art from the measurements; (d) the words "herein," "hereby," "hereto," "hereinbefore," and "hereinafter," and words of similar import, refer to this specification in its entirety and not to any particular paragraph, claim, or other subdivision, unless otherwise specified; (e) descriptive headings are for convenience only and shall not control or affect the meaning or construction of any part of the specification; and (f) "or" and "any" are not exclusive and "include" and "including" are not limiting. Further, the terms, "comprising," "having," "including," and "containing" are to be construed as open-ended terms (i.e., meaning "including but not limited to").

Recitation of ranges of values herein are merely intended to serve as a shorthand method of referring individually to each separate value falling within the range of within any sub ranges there between, unless otherwise clearly indicated herein. Each separate value within a recited range is incorporated into the specification or claims as if each separate value were individually recited herein. Where a specific range of values is provided, it is understood that each intervening value, to the tenth or less of the unit of the lower limit between the upper and lower limit of that range and any other stated or intervening value in that stated range or sub range hereof, is included herein unless the context clearly dictates otherwise. All subranges are also included. The upper and lower limits of these smaller ranges are also included therein, subject to any specifically and expressly excluded limit in the stated range.

A hydroelectric generator includes an electrical generator having stationary conductor windings (a stator) and rotating conductor windings (a rotor) attached to a turbine shaft. The conductor windings of the rotor are wound around stacks of magnetic steel laminations. Electromagnets are made by circulating direct current through the conductor windings of the rotor. Water flowing past blades of the turbine causes the rotor to rotate within the stator and move the electromagnets past the stator windings developing a voltage at the generator output terminals. Collector rings are provided on the turbine shaft to enable a rotating connection between the conductor windings on the rotating rotor and a stationary direct current source used to energize the electromagnets. The collector rings are electrically coupled to the rotor windings and form the rotating portion of the rotating connection, and brushes that are in contact with the collector rings are electrically coupled to the direct current source and form the stationary portion of the rotating connection.

The collector rings may be one-piece collector rings or multi-piece collector rings. Multi-piece collector rings may be replaced without disassembly of the hydroelectric generator. One-piece collector rings, however, are installed on the turbine shaft prior to assembly of the hydroelectric generator. For an inclined hydroelectric generator, repair or replacement of the one-piece collector rings often involves substantial disassembly of the hydroelectric generator. Aspects of the present disclosure can provide methods and systems for repairing collector rings of an inclined hydroelectric generator without disassembling the hydroelectric generator.

Figure 1:
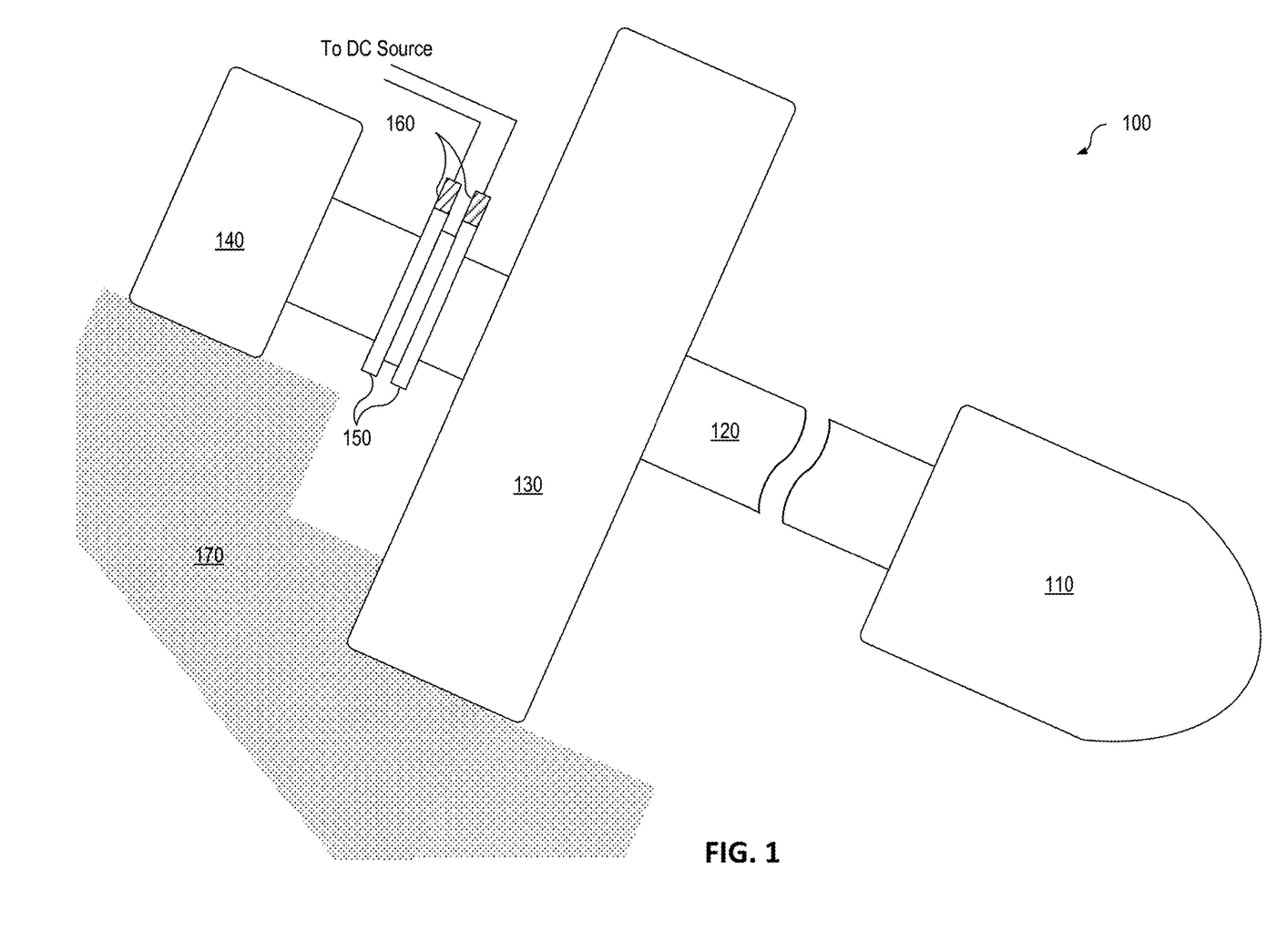
FIG. 1 is a simplified block diagram illustrating an example of an inclined hydroelectric generator illustrating the collector rings according to some aspects of the present disclosure.

FIG. 1 is a simplified block diagram of an inclined hydroelectric generator 100 illustrating the collector rings according to some aspects of the present disclosure. The inclined hydroelectric generator 100 may be, for example, an inclined-S hydroelectric generator or another type of inclined hydroelectric generator. Referring to FIG. 1, the hydroelectric generator 100 may include a hydraulic turbine 110, a turbine shaft 120, and an electric generator housing 130. An electric generator (not shown) including a stator and a rotor may be enclosed within the electric generator housing 130. The hydraulic turbine 110 may convert the energy of flowing water into mechanical energy to rotate the turbine shaft 120. The turbine shaft 120 may rotate the rotor of the electric generator to generate electricity. The end of the turbine shaft 120 may be supported by a shaft bearing enclosed in a bearing housing 140. The inclined hydroelectric generator 100 may be set at an inclination angle such that the axis of rotation of the turbine shaft 120 may form an acute angle in a range between zero degrees and 89 degrees with respect to a horizontal plane. For example, the inclination angle may be 24 degrees or another angle, with respect to a horizontal plane.

Collector rings 150 may be disposed between the electric generator housing 130 and the bearing housing 140. The collector rings 150 may conduct direct current from a direct current source to windings of the rotor to energize electromagnets of the rotor and enable the electric generator to generate electricity. Brushes 160 may contact to the collector rings 150 to couple the windings of the rotor to a direct current source (not shown). As illustrated in FIG. 1, supporting structure 170 disposed around the inclined hydroelectric generator 100 may limit the available space to perform reconditioning operations on the collector rings 150.

Reconditioning operations for the collector rings may include coarse machining operations, for example, single point cutting, or removing material from the surface of the collector rings to remove damaged areas and restore runout of the collector rings to within specified tolerances. In addition, fine machining operations such as grinding may be performed to provide a specified surface finish for the collector rings. Conventional methods for reconditioning collector rings may involve installing machinery in a "squirrel cage" configuration where the machinery rotates around stationary collector rings to perform the reconditioning. Within inclined hydroelectric generator, however, the limited space available around the turbine shaft and collector rings preclude the use of this type of machinery.

Figure 2A:
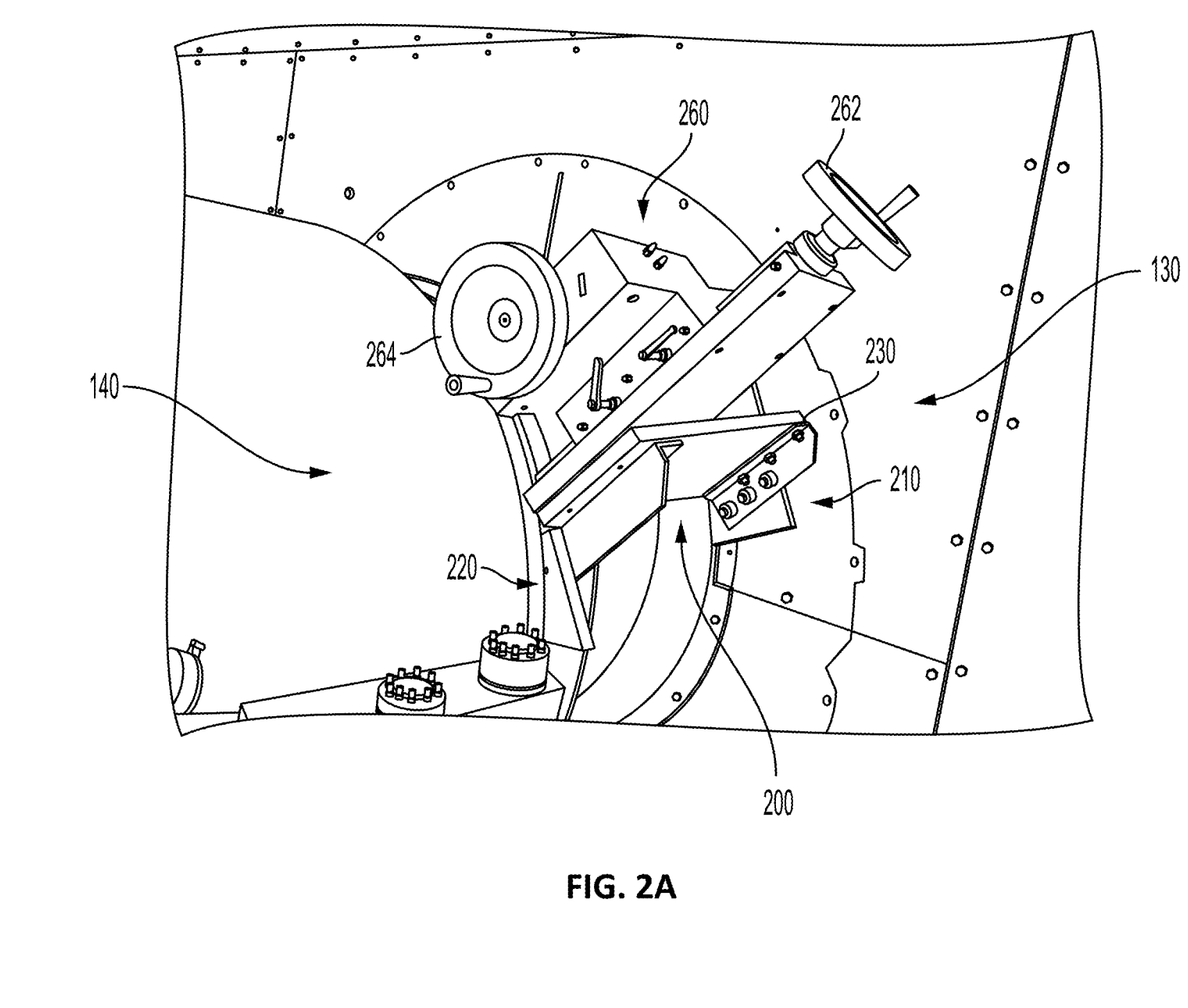
FIG. 2A is a diagram illustrating an example of a support member for supporting reconditioning equipment according to some aspects of the present disclosure.

According to aspects of the present disclosure, machinery for reconditioning the collector rings of an inclined hydroelectric generator is installed at the same angle of inclination as the axis of rotation of the turbine shaft. The machinery is maintained at the axis of inclination while rotation of the turbine shaft is controlled to perform the reconditioning operations, also referred to herein as machining operations. FIG. 2A is a diagram illustrating a support member 200 for supporting reconditioning equipment according to some aspects of the present disclosure. The support member 200 may include first supporting brackets 210, second supporting brackets 220, and a support shelf 230.

The first supporting brackets 210 may be attached to the electric generator housing 130. The second supporting brackets 220 may be attached to the bearing housing 140. The first and second supporting brackets 210, 220 may be attached by any suitable means, for example, but not limited to, bolting, welding, etc. The support shelf 230 may be attached to the first supporting brackets 210 and the second supporting brackets 220. The first and second supporting brackets 210, 220 may include provisions for positional adjustment such that the support shelf 230 when attached to the first and second supporting brackets can be positioned at an angle parallel to the angle of the axis of rotation of the turbine shaft.

While the first supporting brackets are illustrated and described as being attached to the electric generator housing 130, other suitable points of attachment may be used without departing from the scope of the present disclosure. Similarly, while the second supporting brackets 220 are illustrated and described as being attached to the bearing housing 140, other suitable points of attachment may be used without departing from the scope of the present disclosure. Further, the support shelf and the first and second supporting brackets may be modified based on the specific application without departing from the scope of the present disclosure.

An adjustable positioning device 260, for example an X-Y table or other positioning device, configured to provide fine movements of a tool with respect to the turbine shaft and collector rings may be attached to the support shelf 230. The fine movements may be, for example in increments of thousands of an inch or other increments. Machine tools for performing the machining operations on the collector rings may be attached to the adjustable positioning device 260 and the adjustable positioning device 260 may provide positional adjustments of the machine tools with respect to the collector ring. The adjustable positioning device 260 may include a first adjuster 262 configured to provide fine movement of a machine tool mounted on the adjustable positioning device 260 in a direction toward or away from the collector rings. The adjustable positioning device 260 may further include a second adjuster 264 configured to provide fine movement of the machine tool mounted on the adjustable positioning device 260 in a direction parallel to the axis of rotation of the turbine shaft and collector rings.

Figure 2B:
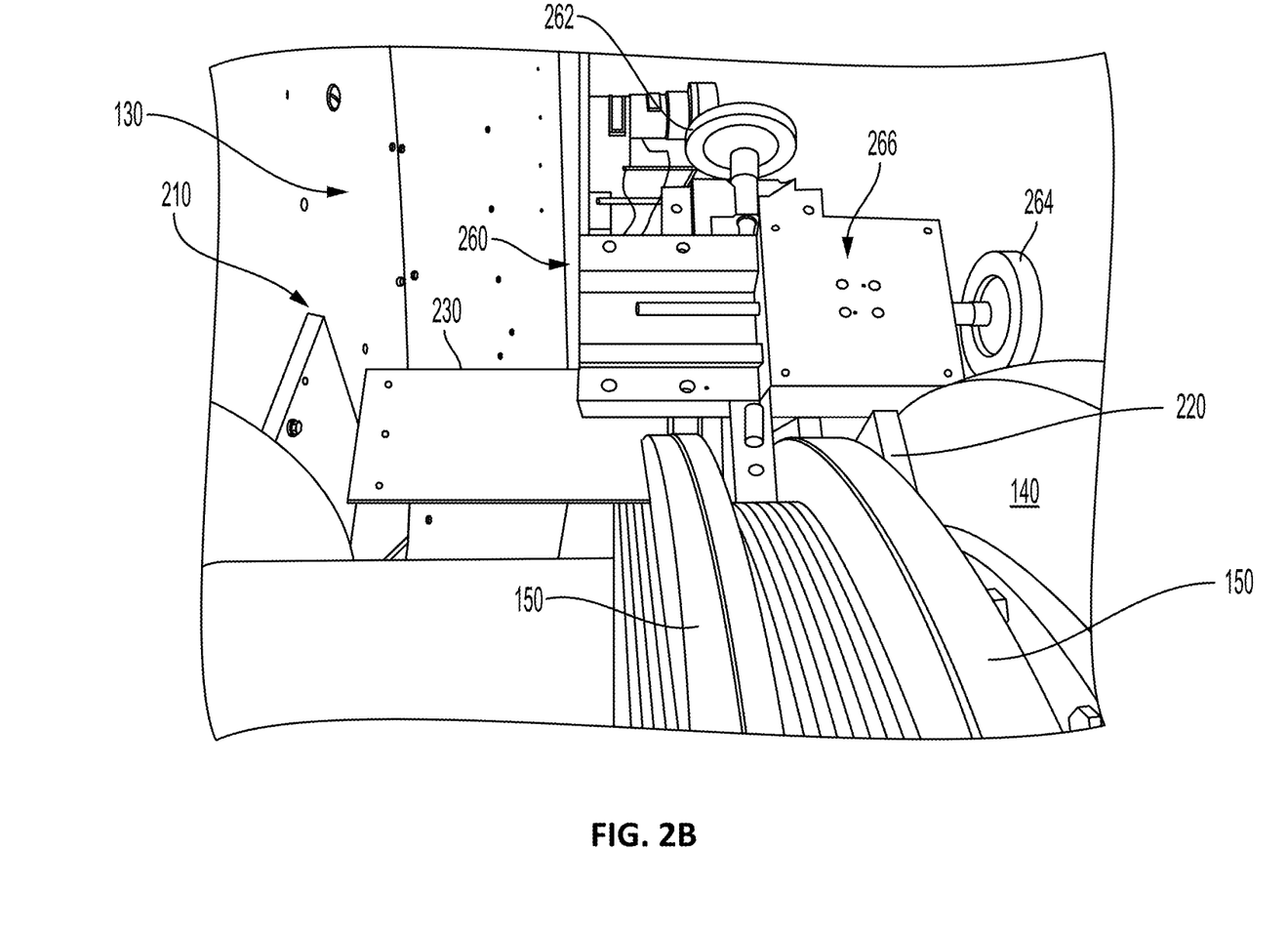
FIG. 2B is a diagram illustrating another view of the example of the support member for supporting reconditioning equipment shown in FIG. 2A according to some aspects of the present disclosure.

FIG. 2B is a diagram illustrating another view of the example of the support member for supporting reconditioning equipment shown in FIG. 2A according to some aspects of the present disclosure. FIG. 2B illustrates the adjustable positioning device 260 attached to the support shelf 230 in a position for performing machining operations on the collector rings 150. Only a portion of the second supporting brackets 220 that support the support shelf 230 can be seen attached to the bearing housing 140 in the figure. As can be seen in FIGS. 2B, the first adjuster 262 may provide fine movements of a machine tool mounted to the attaching plate 266 of the adjustable positioning device 260 in a direction toward or away from the collector rings, while the second adjuster 264 may provide fine movements of the machine tool in a direction parallel to the axis of rotation of the turbine shaft.

Figure 3:
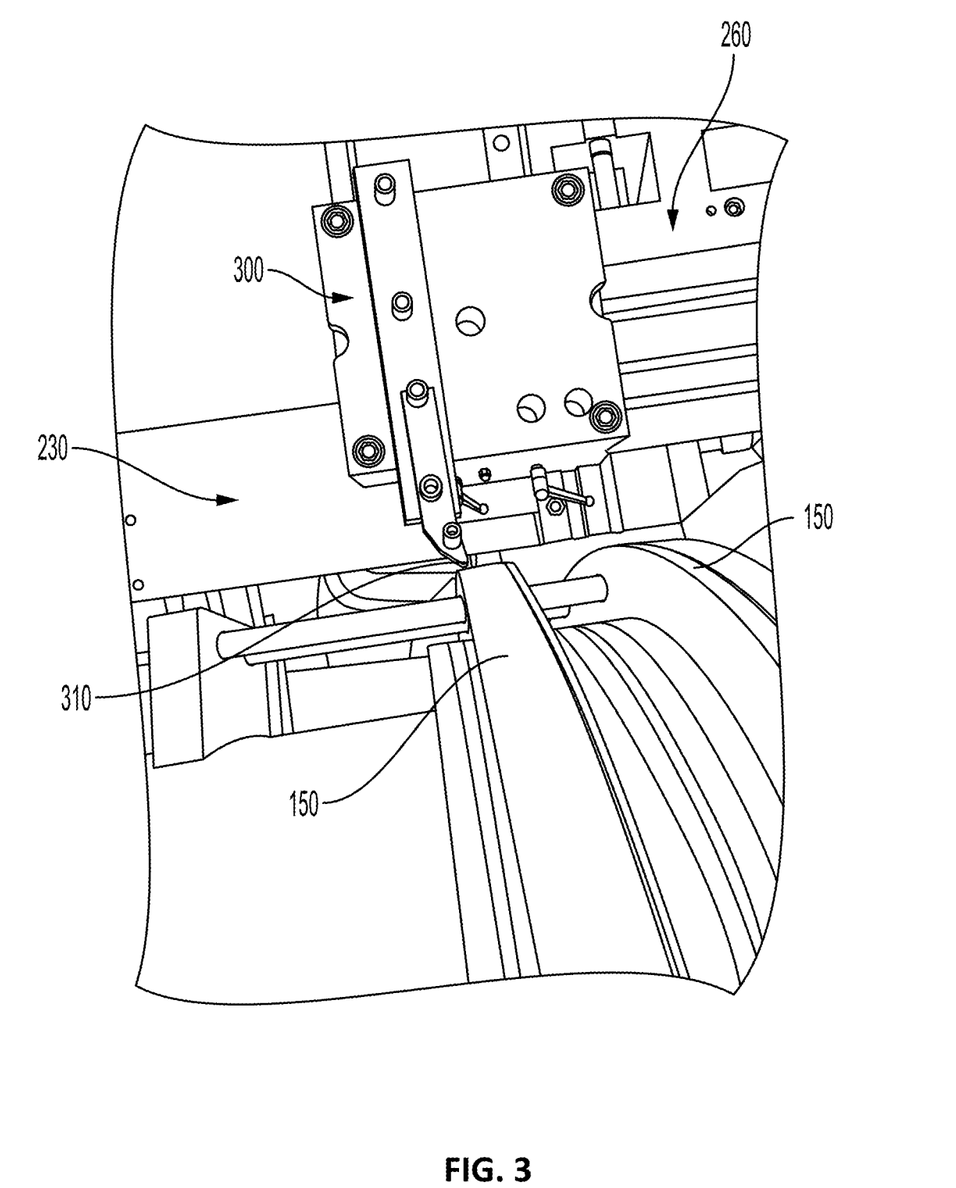
FIG. 3 is a diagram illustrating an example of a single point cutting tool according to some aspects of the present disclosure.

The machining (reconditioning) operations may include coarse material removal and fine material removal from the collector rings. The coarse material removal may be performed using a machine tool for cutting, for example, a single point cutting tool. The fine material removal may be performed using, for example, a machine tool for grinding, such as a powered grinding tool. FIG. 3 is a diagram illustrating an example of a single point cutting tool 300 according to some aspects of the present disclosure. As shown in FIG. 3, the single point cutting tool 300 may include a cutting tip 310 fabricated from a hardened material, for example, but not limited to, carbide, diamond, etc.

The single point cutting tool 300 may be used to remove damaged areas and restore runout of the collector rings to within specified tolerances. The single point cutting tool 300 may be attached to the adjustable positioning device 260 and its position adjusted via the first and second adjusters 262, 264 to remove material from the collector rings 150. The depth of each cut (e.g., the amount of material removed) may be set using the first adjuster 262. The single point cutting tool 300 may be traversed across a collector ring 150 in a direction parallel to the axis of rotation of the turbine shaft using the second adjuster 264 during each cutting operation. Several cutting operations may be performed to remove the damaged material and establish the specified runout of a collector ring 150.

Figure 4:
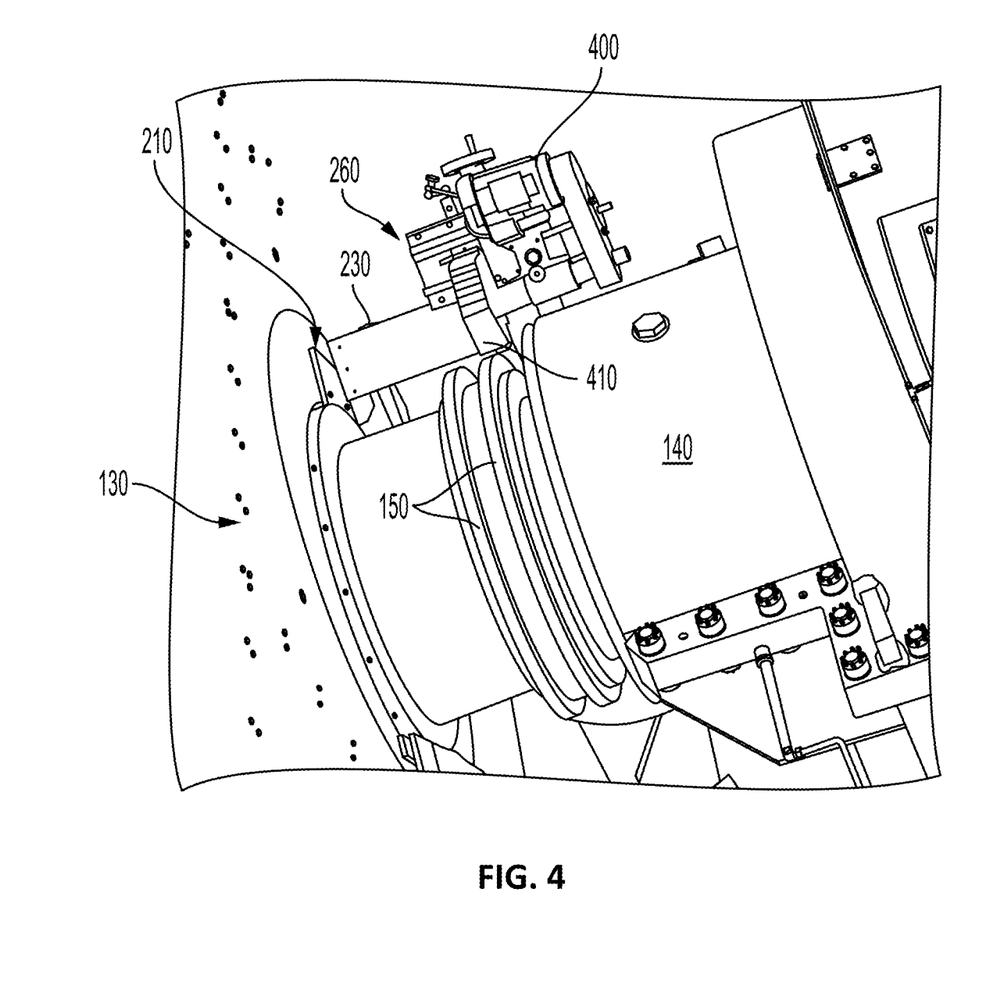
FIG. 4 is a diagram illustrating an example of a grinding tool according to some aspects of the present disclosure.

FIG. 4 is a diagram illustrating an example of a grinding tool 400 according to some aspects of the present disclosure. As shown in FIG. 4, the grinding tool 400 may be a powered grinding tool having an abrasive grinding wheel 410. The grinding tool 400 may be used to achieve a specified surface finish on the collector rings 150. The abrasive grinding wheel 410 may have a grit appropriate for providing the specified surface finish. The grinding tool 400 may be supported on the support shelf 230. The first and second supporting brackets 210, 220 for the support shelf 230 that are attached to the electric generator housing 130 and the bearing housing 140, respectively, are not visible in the figure.

The abrasive grinding wheel 410 may have a width equal to or greater than a width of the collector ring 150. The amount of material removed during each grinding operation may be set using the first adjuster 262. Several grinding operations may be performed on a collector ring 150 to achieve the specified surface finish.

Since the machinery used to perform the reconditioning operations on the collector rings is maintained in a stationary position with respect to the axis of rotation of the turbine shaft, means must be provided for rotating the turbine shaft, and hence the collector rings, in order to perform the machining operations on the collector rings. According to some aspects of the present disclosure, hydraulic power provided by a water source acting on the turbine of the hydroelectric generator may be used to provide rotation of the collector rings during the machining operations.

Utilizing existing capabilities of equipment, the hydroelectric generator may be rotated using the hydraulic force by slowly opening the headgate and positioning the wicket gates that control water flow into turbine. The combined control of the headgate and wicket gates can be used to create slow rotation of the turbine for performing the machining operations on the collector rings. No external drive unit (e.g., turning gear) is required to provide the rotation.

Figure 5:
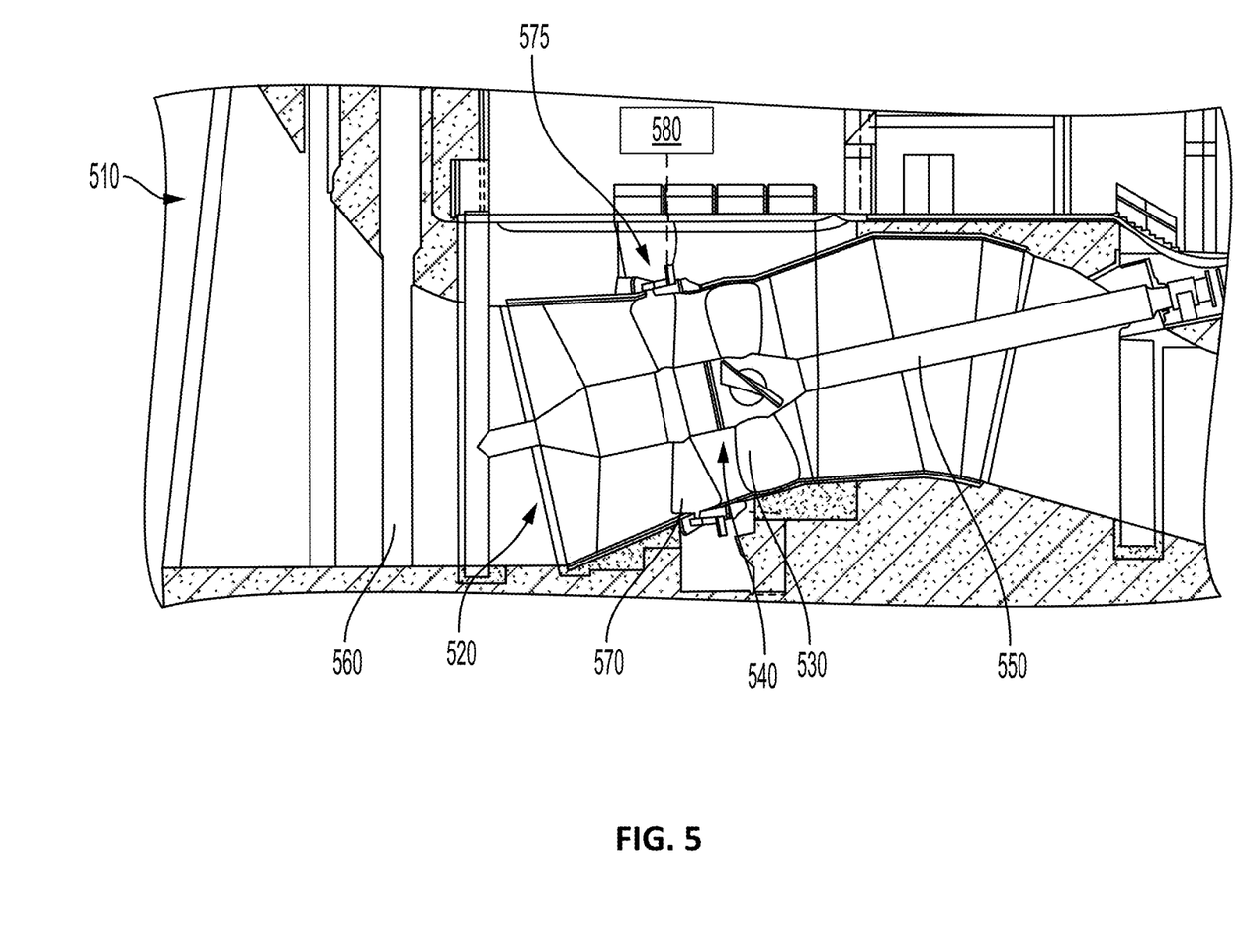
FIG. 5 is a simplified diagram illustrating an example of a turbine portion of a hydroelectric generator according to some aspects of the present disclosure.

FIG. 5 is a simplified diagram illustrating an example of a turbine portion of a hydroelectric generator according to some aspects of the present disclosure. Referring to FIG. 5, water from a water source 510, for example, a lake, a reservoir, or other body of water, flows into a water intake 520 and over blades 530 of a turbine runner 540. The water flowing over the blades 530 causes the turbine runner 540 to rotate. The rotation of the turbine runner 540 is transmitted be via the turbine shaft 550 to the electrical generator. The collector rings (e.g., the collector rings 150) rotate with the rotation of the turbine shaft 550.

The amount of water from the water source 510 that is admitted to the water intake 520 may be controlled by a headgate 560. Raising the headgate 560 to a fully open position can admit as much water as possible to the water intake 520. Conversely, lowering the headgate 560 to a fully closed position can block the flow of water to the water intake 520. During normal operation of the hydroelectric generator, the headgate 560 may be fully open. The amount of water admitted to the water intake 520 that flows over the blades 530 of the turbine runner 540 may be regulated by the position of wicket gates 570. The wicket gates 570 are a series of vanes around the periphery of the turbine that may be actuated in parallel to regulate the flow of water through the turbine. The position of the wicket gates 570 may be controlled by a governor 580. Controlling the amount of water flowing over the blades 530 of the turbine runner 540 can regulate the speed at which the turbine runner 540 rotates.

Figure 6:
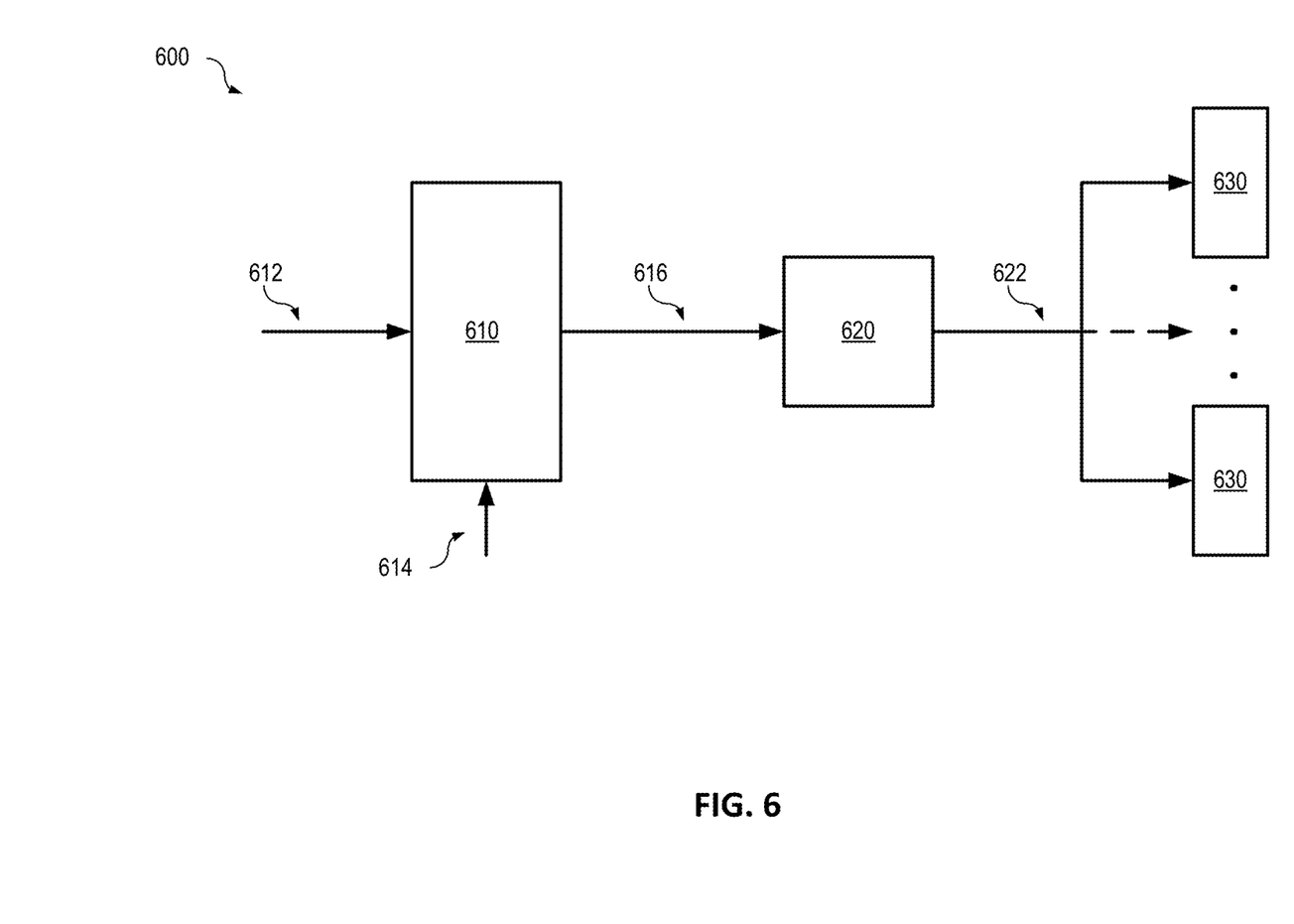
FIG. 6 is a simplified block diagram illustrating an example of a governor control system according to some aspects of the present disclosure.

FIG. 6 is a simplified block diagram illustrating an example of a governor control system 600 according to some aspects of the present disclosure. Referring to FIG. 6, a governor controller 610 may receive a setpoint input 612. For example, an operator may input a desired speed setpoint for the turbine. The governor controller 610 may also receive a feedback signal 614 of the actual rotational speed of turbine shaft. Based on the setpoint input 612 and the feedback signal 614, governor controller 610 may output a control signal 616 to a turbine control actuator 620. Based on the control signal 616, the turbine control actuator 620 may generate actuation signals 622 to turbine control devices 630 (e.g., the wicket gates 570). The wicket gates may be actuated by hydraulic means, mechanical means, electrical means, or combinations thereof.

Machining operations for the collector rings may be performed at relatively low revolutions-per-minute (RPM) of the turbine shaft and collector rings. For example, the specified rotational speed for performing the single point machining operations may be approximately 22 RPM, and the specified rotational speed for performing the grinding operations may be approximately 6-9 RPM. The headgate (e.g., the headgate 560) and the wicket gates 570 may be utilized to provide regulation of the rotational speed of the turbine shaft and collector rings to the low RPMs required for performing the machining operations.

Referring again to FIG. 5, for low RPM operation of the turbine, the headgate 560 may be lowered such that a minimal amount of water from the water source 510 may be admitted to the water intake 520. The RPM of the turbine shaft 550 may then be regulated using the wicket gates 570 to the RPMs needed for the machining operations. For example, a setpoint RPM for the turbine shaft 550 may be input to a governor (e.g., the governor controller 610), and the governor may provide control of the wicket gates 570 to maintain the specified rotational speed of the turbine shaft 550 at the setpoint RPM.

Once the turbine shaft speed is regulated to the specified RPM for the machining operation, the position of the tool for performing the machining operation may be adjusted in the machining operation performed. For example, referring to FIG. 2B, for performing a coarse machining operation to remove damaged material from the collector ring, a depth of the cut for a single point cutting tool (e.g., the single point cutting tool 300) attached to the adjustable positioning device 260 may be set using the first adjuster 262. The material may be removed from the collector ring 150 by traversing the single point cutting tool across the collector ring 150 in the axial direction of the turbine shaft using the second adjuster 264 while the turbine shaft and collector ring 150 are rotating at the specified RPM.

Figure 7:
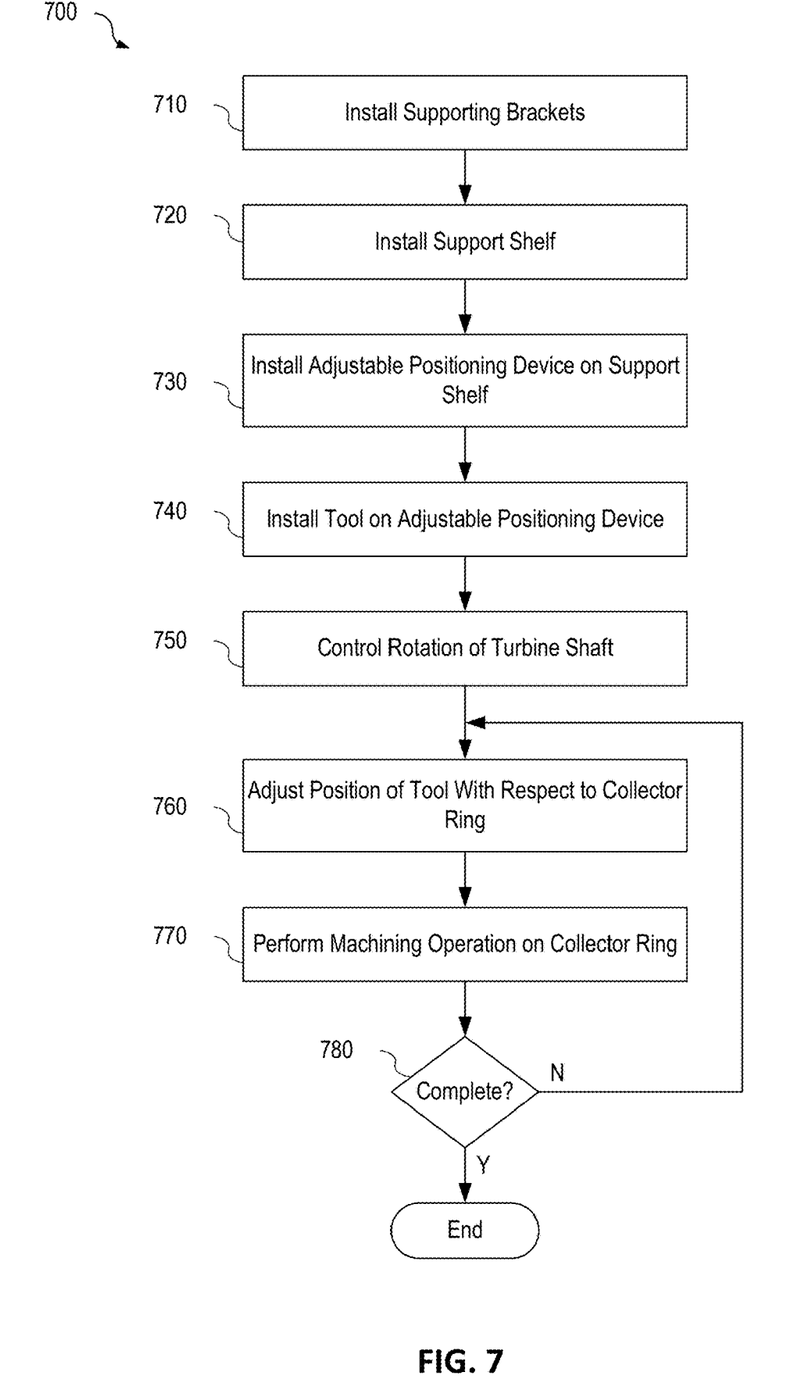
FIG. 7 is a flowchart illustrating an example of a method for in-place machining of a collector ring of a hydroelectric generator according to aspects of the present disclosure.

Similarly, for a grinding operation to achieve a specified surface finish of the collector ring 150, once the turbine shaft speed is regulated to the specified RPM for the grinding operation, the position of the grinding tool attached to the adjustable positioning device 260 may be set using the first adjuster 262 to remove a specified amount of material from the collector ring to achieve the specified surface finish. Since the grinding mill of the grinding tool may be equal to or wider than the width of the collector ring 150, traversing the grinding tool in FIG. 7 is a flowchart illustrating an example of a method 700 for in-place machining of a collector ring of a hydroelectric generator according to aspects of the present disclosure. Referring to FIG. 7, at block 710, supporting brackets may be installed. Supporting brackets (e.g., the first and second supporting brackets 210, 220) may be installed to stationary portions of the hydroelectric generator. For example, the first supporting brackets may be attached to the electric generator housing (e.g., the electric generator housing 130) and the second supporting brackets may be attached to the bearing housing (e.g., the bearing housing 140). The supporting brackets may be attached by any suitable means, for example, but not limited to, bolting, welding, etc.

At block 720, a support shelf may be installed. A support shelf (e.g., the support shelf 230) may be installed on the supporting brackets. The supporting brackets may support the support shelf at an angle parallel to the turbine shaft. The supporting brackets may include provisions for positional adjustment such that the support shelf when attached to the supporting brackets can be positioned at an angle parallel to the angle of the axis of rotation of the turbine shaft.

At block 730, an adjustable positioning device may be installed on the support shelf. The adjustable positioning device (e.g., the adjustable positioning device 260) may be, for example, an X-Y table or other positioning device. The adjustable positioning device may be configured to provide fine movements of a tool, for example in increments of thousands of an inch or other increments, with respect to the turbine shaft and collector rings. The adjustable positioning device may provide fine movements in a direction toward or away from the collector ring as well as in a direction parallel to the axis of rotation of the turbine shaft and collector ring.

At block 740, a machining tool may be installed on the adjustable positioning device. For initial machining operations to remove damaged portions of the collector ring and restore runout of the collector ring within specified tolerances, a single point cutting tool may be installed on the adjustable positioning device. The single point cutting tool may include a cutting tip fabricated from a hardened material, for example, but not limited to, carbide, diamond, etc.

For finish machining operations to restore a specified surface finish to the collector ring, a grinding tool may be installed on the adjustable positioning device. The grinding tool may be a powered grinding tool having an abrasive grinding wheel that has a width equal to or greater than a width of the collector ring. The abrasive grinding wheel may have a grit appropriate for providing the specified surface finish.

At block 750, rotation of the turbine shaft may be controlled. Rotation of the turbine shaft may be controlled by controlling the amount of water flowing over the blades of the turbine runner. The amount of water flowing over the blades of the turbine runner may be determined by a combination of headgate position and wicket gate position. The rotation (RPM) of the turbine shaft may be controlled to an appropriate RPM for the machining operation. For example, rotation of the turbine shaft may be regulated to approximately 22 RPM for single point cutting operations, while grinding operations may be performed at a rotational speed of approximately 6-9 RPM.

At block 760, a position of the machining tool with respect to the collector ring may be adjusted. The position of the machining tool may be adjusted using adjusters (e.g., first and second adjusters 262, 264) of the adjustable positioning device. The first adjuster may provide fine movements (e.g., thousandths of an inch) of the machining tool in a direction toward or away from the collector ring to determine an amount of material to be removed from the collector ring. The second adjuster may traverse the machining tool, for example the single point cutting tool, across a collector ring in a direction parallel to the axis of rotation of the turbine shaft. For machining operations using the grinding tool having a width of the grinding wheel greater than the width of the collector ring, traversing the grinding tool across the width of the collector ring using the second adjuster may not be required.

At block 770, a machining operation may be performed on the collector ring. The machining operation may be a cutting operation or a grinding operation. The cutting operation may be performed using the single point cutting tool to remove damaged portions of the collector ring. After an amount of material to be removed from the collector ring is set using the first adjuster, the single point cutting tool may be traversed across the collector ring in a direction parallel to the axis of rotation of the turbine shaft using the second adjuster.

For a grinding operation, an amount of material to be removed from the collector ring may be set using the first adjuster, and the abrasive grinding wheel of the powered grinding tool may grind the surface of the collector ring as the turbine shaft rotates to achieve the required surface finish on the collector ring.

At block 780, it may be determined whether the machining operation is complete. For example, a cutting operation may be complete when a single point cutting tool has traversed the width of the collector ring and all damaged portions of the collector ring have been removed and runout of the collector ring is within specified tolerances. Similarly, a grinding operation may be complete when the surface finish of the collector ring is within a specified surface finish requirement at a current grinding tool position.

In response to determining that the machining operation is not complete, for example, all damage has not been removed or the required surface finish has not been achieved (780-N), the method may continue at block 760 by adjusting the position of the tool. For example, the position of the single point cutting tool or the grinding tool may be adjusted (e.g., using the first adjuster 262) to remove more material from the collector ring.

In response to determining that the machining operation is complete (780-Y), the method may end.

The specific operations illustrated in FIG. 7 provide a particular method for in-place machining of a collector ring of a hydroelectric generator according to an embodiment of the present disclosure. Other sequences of operations may also be performed according to alternative embodiments. For example, alternative embodiments of the present disclosure may perform the operations outlined above in a different order. Moreover, the individual operations illustrated in FIG. 7 may include multiple sub-operations that may be performed in various sequences as appropriate to the individual operation. Furthermore, additional operations may be added or removed depending on the particular applications.

Figure 8:
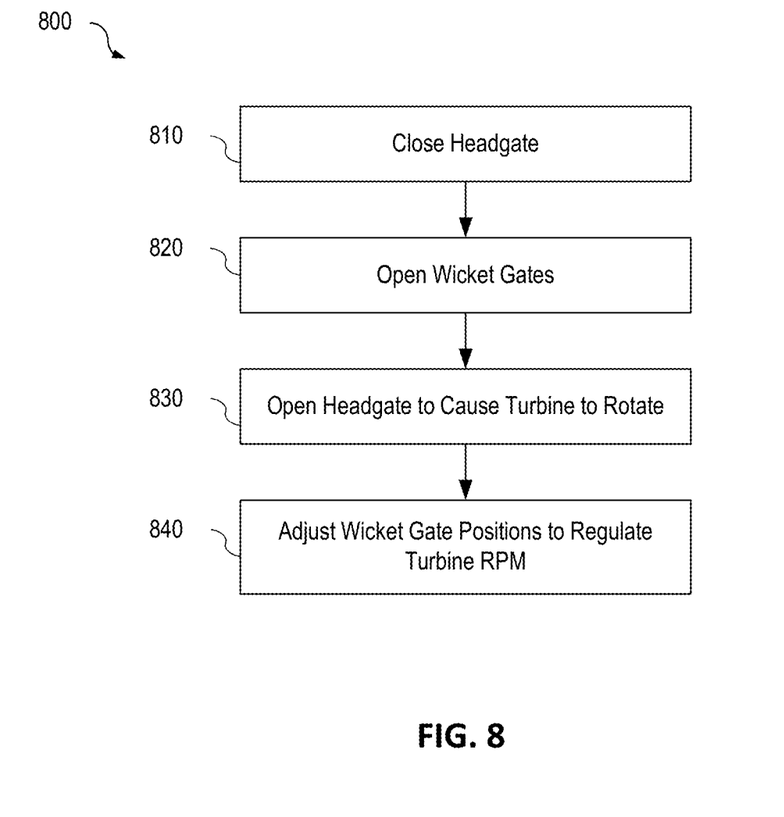
FIG. 8 is a flowchart illustrating an example of a method for controlling the rotational speed of a turbine shaft during in-place machining of a collector ring of a hydroelectric generator according to aspects of the present disclosure.

FIG. 8 is a flowchart illustrating an example of a method 800 for controlling the rotational speed of a turbine shaft during in-place machining of a collector ring of a hydroelectric generator according to aspects of the present disclosure. Referring to FIG. 8, at block 810, the headgate may be closed. The headgate is a barrier that regulates water released from a reservoir to the hydroelectric generator. The amount of water that is released to the turbine of the hydroelectric generator can be controlled by the headgate. When the headgate is fully opened, a maximum amount of water is released to the turbine. When the headgate is closed, no water is released to the turbine and the turbine may cease rotation.

At block 820, the wicket gates may be opened. Wicket gates are a series of adjustable vanes that encircle the turbine to control the flow of water into the turbine. The vanes are coupled mechanically in parallel, for example to an adjustable gate ring. Actuating the wicket gates via the gate ring regulates water flow to the runner blades of the turbine. The position of the wicket gates may be controlled by a governor. A setpoint for rotational speed of the turbine may be input to the governor to cause the wicket gates to move to an open position.

At block 830, the headgate may be opened. The headgate may be opened slowly until water flowing past the headgate and through the wicket gates causes rotation of the turbine. The partial opening of the headgate may enable sufficient water flow to rotate the turbine at a higher RPM than necessary for the machining operations.

At block 840, the wicket gate position may be adjusted to regulate turbine RPM. The flow of water through the turbine may be regulated by the position of the wicket gates from the higher RPM provided by the water flow from the headgate to a lower RPM for the machining operations. For example, water flow through the partially opened headgate may cause the turbine to rotate at approximately 30 RPM. By adjusting the position of the wicket gates to restrict the water flow through the turbine, the rotational speed of the turbine may be regulated to approximately 22 RPM needed for the machining operation.

To regulate the turbine rotational speed using the wicket gates, a setpoint value for rotational speed of the turbine may be input to the governor by an operator, and the governor may control the position of the wicket gates to regulate the rotational speed. In some cases, a feedback signal of the actual rotational speed of the turbine shaft may be provided to the governor and the governor may act to maintain the setpoint rotational speed based on the feedback signal. In some cases, an operator may monitor the rotational speed of the turbine and additionally or alternatively provide manual setpoint adjustments to the governor settings to maintain the setpoint rotational speed. The governor may control the position of the wicket gates via a linkage to the wicket gates. The linkage may be, for example, but not limited to, mechanical, electrical, hydraulic, etc.

By utilizing the existing capabilities of equipment, the hydroelectric generator is rotated using hydraulic force (e.g., water power) by slowly opening the headgate and positioning the wicket gates that control water flow into turbine to create slow rotation of the turbine for performing the machining operations on the collector rings. No external drive unit (e.g., turning gear) is required to provide the rotation. Even in cases where turning gear is available, the turning gear may be damaged by operation for the extended duration needed to perform the machining operations.

The specific operations illustrated in FIG. 8 provide a particular method for controlling the rotational speed of a turbine shaft during in-place machining of a collector ring of a hydroelectric generator according to an embodiment of the present disclosure. Other sequences of operations may also be performed according to alternative embodiments. For example, alternative embodiments of the present disclosure may perform the operations outlined above in a different order. Moreover, the individual operations illustrated in FIG. 8 may include multiple sub-operations that may be performed in various sequences as appropriate to the individual operation. Furthermore, additional operations may be added or removed depending on the particular applications.

The examples and embodiments described herein are for illustrative purposes only. Various modifications or changes in light thereof will be apparent to persons skilled in the art. These are to be included within the spirit and purview of this application, and the scope of the appended claims, which follow.

What is claimed is:

1. A method for in-place machining of a collector ring attached to a turbine shaft of a hydroelectric generator, the method comprising:
   attaching a support member to stationary portions of the hydroelectric generator, the support member being configured to support a machine tool at an angle parallel to an inclination angle of an axis of rotation of the turbine shaft;
   attaching an adjustable positioning device to the support member;
   attaching the machine tool to the adjustable positioning device, the machine tool being configured to perform a machining operation on the collector ring;
   controlling a rotational speed of the turbine shaft to a specified rotational speed by controlling a flow of water through a turbine of the hydroelectric generator;
   adjusting the adjustable positioning device to adjust a position of the machine tool with respect to the collector ring; and
   performing the machining operation on the collector ring at the specified rotational speed of the turbine shaft.

2. The method of claim 1, wherein controlling a rotational speed of the turbine shaft comprises:
   closing a headgate of a water intake of the turbine to stop the flow of water from a water source and cause the turbine to cease rotation;
   setting wicket gates of the turbine to an open position;
   admitting an amount of the water from the water source to the water intake of the turbine to rotate the turbine at a rotational speed higher than a specified rotational speed for performing the machining operation on the collector ring by partially opening the headgate; and
   adjusting a position of the wicket gates to regulate the rotational speed of the turbine to the specified rotational speed for the machining operation on the collector ring.

3. The method of claim 2, further comprising:
   inputting a setpoint value for the specified rotational speed to a governor to adjust the position of the wicket gates.

4. The method of claim 3, further comprising;
   monitoring the rotational speed of the turbine; and
   manually inputting setpoint adjustments for the specified rotational speed to the governor to maintain the specified rotational speed of the turbine.

5. The method of claim 1, wherein a first machining operation on the collector ring is performed at a first specified rotational speed of the turbine, and
   a second machining operation on the collector ring is performed at a second specified rotational speed slower than the first specified rotational speed of the turbine.

6. The method of claim 5, wherein the machine tool is a single point cutting tool, and
   wherein the first machining operation on the collector ring is an operation to remove damaged portions of the collector ring.

7. The method of claim 5, wherein the machine tool is a grinding tool, and
   wherein the second machining operation on the collector ring is an operation to provide a specified surface finish on the collector ring.

8. The method of claim 5, wherein the first specified rotational speed for the first machining operation is approximately 22 revolutions per minute.

9. The method of claim 5, wherein the second specified rotational speed for the second machining operation is in a range of approximately 6-9 revolutions per minute.

10. The method of claim 1, wherein the inclination angle is an angle in a range of zero degrees and 89 degrees.

* * * * *